United States Patent [19]
Johnson

[11] Patent Number: 5,121,245
[45] Date of Patent: Jun. 9, 1992

[54] LASER SYSTEM INCORPORATING AN ACOUSTO-OPTIC DEVICE HAVING REDUCED SUSCEPTIBILITY TO STRESS-INDUCED BIREFRINGENCE

[75] Inventor: Joel C. Johnson, Lake Oswego, Oreg.

[73] Assignee: Electro Scientific Industries, Inc., Portland, Oreg.

[21] Appl. No.: 334,298

[22] Filed: Apr. 6, 1989

[51] Int. Cl.$^5$ .......................... G02F 1/11; H01S 3/11; H01S 3/117; H01S 3/13
[52] U.S. Cl. ..................................... 359/285; 372/10; 372/13; 372/29; 372/30; 372/27
[58] Field of Search ............... 350/358, 371, 372, 373; 372/10, 13, 25, 27, 29, 30

[56] References Cited

U.S. PATENT DOCUMENTS

| | | | |
|---|---|---|---|
| 3,613,024 | 10/1971 | Geusic et al. | 331/94.5 |
| 4,337,442 | 6/1982 | Mauck | 372/13 |
| 4,412,330 | 10/1983 | Mauck et al. | 372/29 |
| 4,558,926 | 12/1985 | Johnson | 350/373 |
| 4,761,786 | 8/1988 | Baer | 372/10 |

OTHER PUBLICATIONS

Schott Glasswerke, "The Stress-Optical Coefficient of Optical Glasses", Optical Glass Technical Information Bulletin, Aug. 1984.
Schott Optical Glass, Inc., "The Stress-Optical Coefficient", Optical Glass Catalog, Schott Optical Glass, Inc., York Ave., Duryea, Pa.
Schott Optical Glass 3111/U.S.A. Data Sheet Nos. SF 57-847238 and SF 10-728284.
Young, Eddie H., Jr. and Yao, Shi-Kay, "Design Considerations for Acousto-Optic Devices", Proceedings of the IEEE, vol. 69, No. 1, Jan. 1981, 54-64.
Korpel, Adrianus, "Acousto-Optics—A Review of Fundamentals", Proceedings of the IEEE, vol. 69, vol. 69, No. 1, Jan. 1981, 48-53.
Eklund, H., Roos, A., and Eng, S. T., "Rotation of Laser Beam Polarization in Acousto-Optic Devices", Optical and Quantum Electronics, vol. 7, No. 2, Mar. 1975 (73-79).

Primary Examiner—Eugene R. LaRoche
Assistant Examiner—Evelyn A. Lester
Attorney, Agent, or Firm—Stoel Rives Boley Jones & Grey

[57] ABSTRACT

The present invention is a laser system that includes an acousto-optic device (24B) having an optical medium (40B) that maintains a substantially uniform index of refraction even when subjected to nonuniform thermal or mechanical stress. The acousto-optic device provides substantially distortion-free polarized output light that can be directed accurately to strike an intended target.

20 Claims, 3 Drawing Sheets

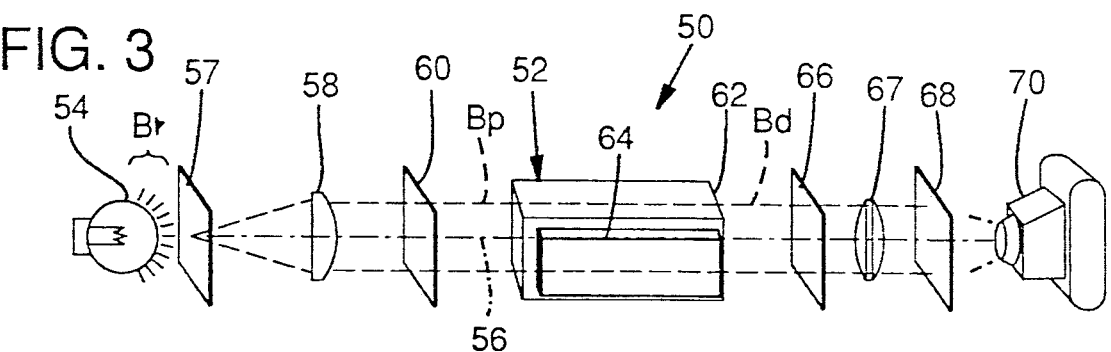
FIG. 3
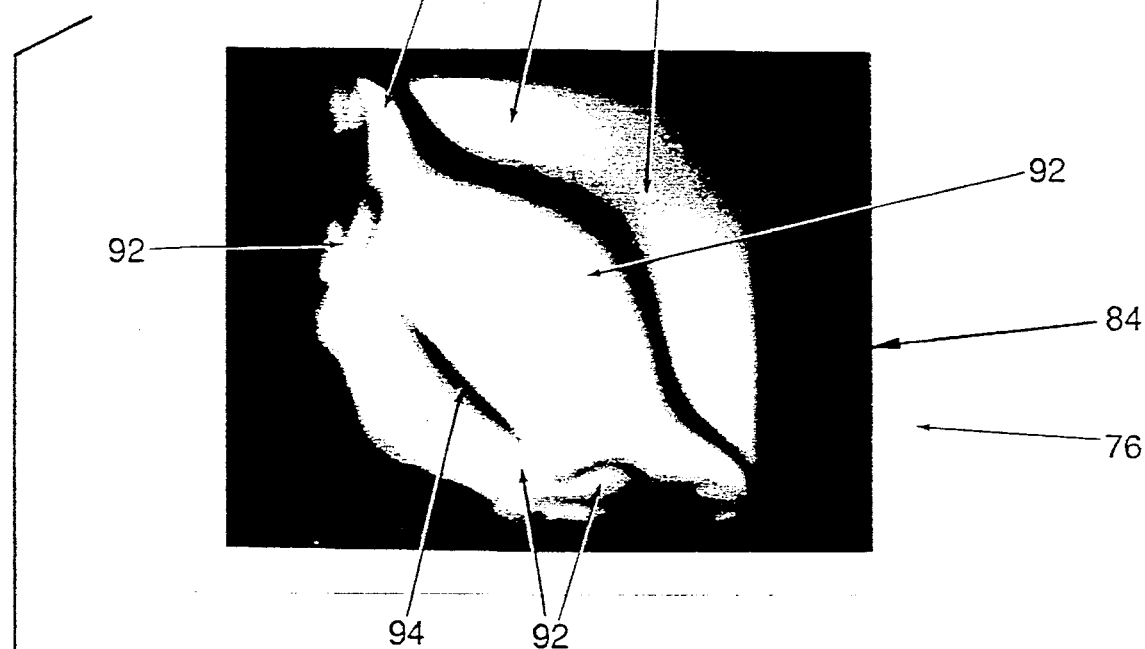
FIG. 4A
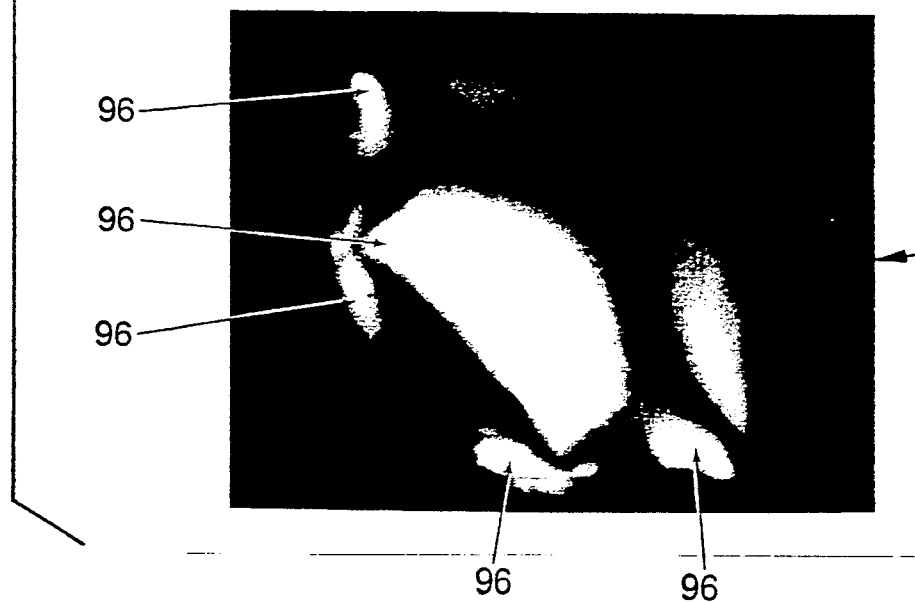

LASER SYSTEM INCORPORATING AN ACOUSTO-OPTIC DEVICE HAVING REDUCED SUSCEPTIBILITY TO STRESS-INDUCED BIREFRINGENCE

TECHNICAL FIELD

The present invention relates to laser systems and, in particular, to a laser system including a laser rod and incorporating an acousto-optic device that alters the optical properties of the light emitted by the laser rod.

BACKGROUND OF THE INVENTION

Certain laser systems employ acousto-optic devices to modulate polarized light beams in a variety of applications such as laser Q-switching, external modulation, and beam deflection. The following background information is presented herein only by way of example with reference to an acousto-optic device functioning as a Q-switch for a laser.

A conventional laser Q-switch includes an optically transparent acousto-optic medium through which incident light having a predetermined nonrandom polarization propagates along an optical path. An acoustic wave transducer coupled to the medium generates acoustic waves that propagate through the medium in a direction transverse to the optical path. The acoustic waves modulate the index of refraction of the medium and form a type of diffraction grating that diffracts the incident light. Detailed descriptions of typical Q-switched lasers can be found in U.S. Pat. No. 4,412,330 of Mauck et al. and U.S. Pat. No. 3,613,024 of Geusic et al.

A Q-switched laser may be employed, for example, to perform micromachining operations such as trimming thin-film resistors or repairing defective integrated circuits. The laser typically employs an acousto-optic Q-switch positioned between a pair of end mirrors in a laser cavity to control laser oscillation and thereby modulate the intensity of radiation within the laser cavity. By effectively blocking one of the end mirrors in the laser cavity, a Q-switch can remove the amount of cavity feedback and greatly increase cavity losses, thereby preventing laser oscillations. Thus when it is in a non-transmissive state, the Q-switch prevents output light emissions from occurring but allows continued storage of optical pumping energy in the laser gain medium. When it is in a transmissive state, the Q-switch increases the amount of cavity feedback and thereby greatly reduces cavity losses and allows the extraction of the stored energy in the form of an output light emission of relatively high peak power.

A Q-switched laser is typically employed in the micromachining of target structures having minimum critical dimensions of between 5 and 75 microns. Such micromachining operations have been successfully accomplished by a laser with output light beam position accuracy and shape tolerances of about 1.0 microns on the target structure. Operating a Q-switched laser within such tolerances could, however, cause the laser beam to machine incorrectly or miss a target structure having minimum critical dimensions of less than about 2.0 microns.

SUMMARY OF THE INVENTION

An object of the present invention is, therefore, to provide a laser system that is capable of providing a high precision light beam with good beam shape and directional accuracy.

Another object of this invention is to provide such a laser system that is capable of generating a light beam that forms a fine point with good positioning accuracy on a target structure.

A further object of this invention is to provide such a laser incorporating an acousto-optic device that is capable of accurately conveying a light beam to a selected position on a target structure.

Still another object of this invention is to provide such a laser system that incorporates an acousto-optic medium functioning as a Q-switch.

Yet another object of the present invention is to provide such a system that is capable of providing high precision micromachining.

The present invention is the result of applicant's investigation into the causes of a number of defective products micromachined with the use of conventional Q-switched lasers incorporating an acousto-optic medium. During his investigation, applicant noted that light beams emitted by laser systems sometimes missed small target areas on a substrate undergoing a micromachining operation. Applicant subsequently determined that such light beam positioning inaccuracy resulted not from faults in the light beam source or the target positioning apparatus but from defects in light beam quality. Applicant observed that the shape of the emitted light beams was irregular. He determined that the quality of polarized light beams entering the acousto-optic devices was adequate but that the light beams exiting the acousto-optic devices were phase distorted and depolarized.

Applicant eventually isolated the cause of the problem, determining that there was laser beam distortion caused by flaws in the annealed isotropic acousto-optic material of the acousto-optic devices receiving the beam emitted by the laser rod. Applicant found defects in the form of some type of stress that produced birefringence in the optical medium. These defects caused slight depolarization of light beams passing through the acousto-optic device. As a consequence, a slightly depolarized light beam propagated through the optical system and struck a polarization sensitive component, such as a polarizing filter, and became a beam of irregular shape. Since the acousto-optic material had been in good condition prior to the production of the acousto-optic devices, applicant determined that the acousto-optic materials somehow became flawed during the manufacture or operation of the acousto-optic devices. Applicant also determined that the acousto-optic medium had a nonuniform stress distribution that typically included portions across its light-receiving surface where beams of a particular polarization could be passed without being depolarized.

The locations of the non-depolarizing portions can be determined under fixed operating and environmental conditions. Directing a light beam through an apparently non-depolarizing portion of a conventional acousto-optic device may, however, be inadequate to avert a problem with birefringence. Since temperature changes resulting from operation of the acousto-optic device can alter the stress distribution of the acousto-optic medium, the non-depolarizing portions may shift their positions. A nonuniform stress distribution may also cause birefringence-related problems because slight shifts in beam focus or beam position may cause the beam to propagate through the stress-affected areas of the acousto-optic medium.

Applicant believes that a stress-induced defect in the acousto-optic medium can be caused by one or more of several phenomena. For example, mechanical stress can be introduced by bonding an acoustic wave transducer to the acousto-optic medium, and thermomechanical stress can be caused by temperature gradients introduced into the acousto-optic medium by the operation of the acoustic wave transducer. Constriction caused by the drying of adhesives used to bond the transducers to the acousto-optic materials may also generate enough force to create mechanical stress.

There are several possible methods for reducing the light beam distortion and depolarization caused by the birefringence characteristics of the acousto-optic devices. One method entails the use of an acousto-optic device with a relatively large light-receiving surface that intercepts the incident light beam. The light beam can then be passed through a portion of the acousto-optic device at a much greater distance from the attached transducer. The material in this portion of the light-receiving surface might be less stressed by bonding factors or an applied radio frequency modulating signal and could, therefore, cause lower distortion of an exiting beam. A second method, which would allow for the use of a smaller Q-switch, entails the use of a polarization correction element, such as a polarizing filter positioned at the output of the acousto-optic device. The use of a polarization correction element is undesirable, however, because it adds significant cost, undesirable bulk, and complexity to the laser, and typically reduces appreciably the intensity of an exiting light beam.

A third method, which is the subject of the present application, stems from applicant's discovery that a lead-based glass developed and previously used primarily for radiation shielding has stress resistance and optical efficiency properties that make it useful as part of an acousto-optic device. The present invention results from applicant's determination that errors in the shape and position of a light beam formed on a target structure by a conventional laser are attributable to depolarization of the light beam as it propagates through the acousto-optic device. Although it could be used in numerous applications, the present invention is described herein only by way of example with reference to a laser that employs an acousto-optic Q-switch and is capable of achieving high precision micromachining.

The acousto-optic medium typically employed in a Q-switch is an annealed isotropic material, such as, for example, fused silica or SF-10 glass. Such materials may be manufactured with low birefringence characteristics. Applicant has determined, however, that Q-switches employing such materials have birefringence characteristics, which applicant believes are introduced in the acousto-optic medium by mechanical and thermomechanical stresses.

The Q-switched laser of the present invention employs, therefore, an acousto-optic Q-switch having a "stress resistant" acousto-optic medium. The stress resistant acousto-optic medium is characterized by a sufficient amount of stress resistance that maintains a substantially uniform index of refraction when such medium is coupled to an acoustic wave transducer. The resulting Q-switch has a relatively large usable region comprising the greater volume of the medium. As a consequence, the resulting Q-switched laser of this invention is capable of emitting a light beam that forms a fine point on a target structure and is capable of accurately directing the light beam to an intended position on the target structure.

Additional objects and advantages of the present invention will be apparent from the following detailed description of a preferred embodiment thereof, which proceeds with reference to the accompanying drawings.

BRIEF DESCRIPTION OF THE DRAWINGS

FIG. 3 is a schematic diagram of a test apparatus for demonstrating the differences in the optical performance capabilities of the acousto-optic Q-switches of FIGS. 2A and 2B.

FIGS. 4A and 4B are photographs showing the light leakage performance characteristics of the acousto-optic Q-switches depicted in the respective FIGS. 2A and 2B when such Q-switches are incorporated into the test apparatus of FIG. 3.

DETAILED DESCRIPTION OF PREFERRED EMBODIMENT

Figure 1:
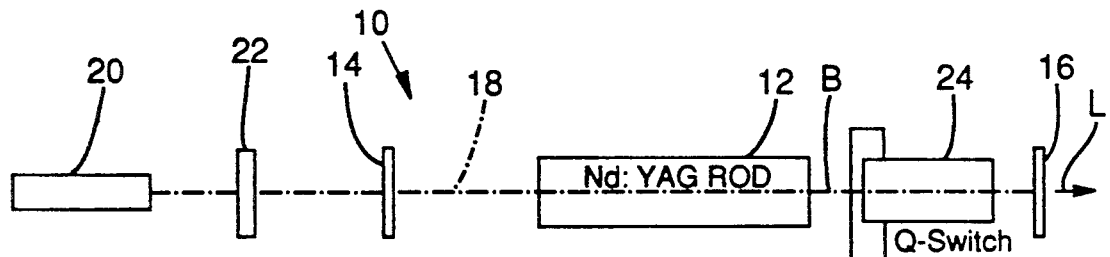
FIG. 1 is a schematic diagram of a laser system incorporating an acousto-optic Q-switch of the present invention.

FIG. 1 is a block diagram of a diode-pumped laser 10 incorporating an acousto-optic Q-switch of the present invention. Laser 10 includes a solid state Nd:YAG rod 12 positioned between a pair of mirrors 14 and 16 along an optic axis 18. Laser 10 also includes a diode-pumped light source 20 located on the opposite side of mirror 14 from laser rod 12 and aligned along optic axis 18. A lens system 22 of conventional design interposed between mirror 14 and light source 20 and positioned along optic axis 18 collimates, focuses, or corrects the output light emitted by light source 20. Skilled persons will appreciate that laser 10 may be pumped in a variety of ways. For example, light source 20 may be positioned perpendicular to instead of along optic axis 18 to allow pumping from the side.

Mirror 14 transmits most of the light emitted by light source 20 and reflects most of the light emitted by laser rod 12, and mirror 16 transmits part of the light emitted by laser rod 12. An acousto-optic Q-switch 24 interposed along the optic axis 18 between mirror 16 and laser rod 12 modulates radiation intensity produced by laser rod 12 at a switching rate determined by a control circuit 26. Skilled persons will appreciate that Q-switch 24 may alternatively be positioned between mirror 14 and laser rod 12.

Control circuit 26 includes a repetition rate oscillator 28 and a repetition rate gate 30 that cooperate to provide a series of gating pulses P to the gate input of an RF signal gate 32. Signal gate 32 receives as its signal input a continuous-wave signal from an RF signal oscillator 34 and, in response to the pulses P delivered by repetition rate gate 30, develops a stream of RF pulses of a frequency determined by the frequency of signal oscillator 34 for a duration determined by the pulse width of the pulses P. The delivery of pulses P to signal gate 32 inhibits the production of RF pulses at the output of signal gate 32. An amplifier 36 amplifies the stream of RF pulses and delivers them to an acoustic wave transducer 38 (FIG. 2), which forms a part of Q-switch 24.

Whenever it receives an RF pulse from the output of amplifier 36, transducer 38 launches an acoustic wave 5 that interacts with an optical medium 40 (FIG. 2) forming a part of Q-switch 24. The acoustic wave propagates in a direction perpendicular to optic axis 18 and causes a change in the refractive index of optical medium 40. During the time the acoustic wave propagates through optical medium 40, the energy of a light beam B, which emanates from laser rod 12 and travels along optic axis 18, accumulates within optical medium 40. Whenever transducer 38 does not receive an RF pulse from the output of amplifier 36, no acoustic wave propagates through optic medium 40 and the stored energy of light beam B is released in the form of laser output pulse L from Q-switch 24 of the laser 10.

Figure 2A:
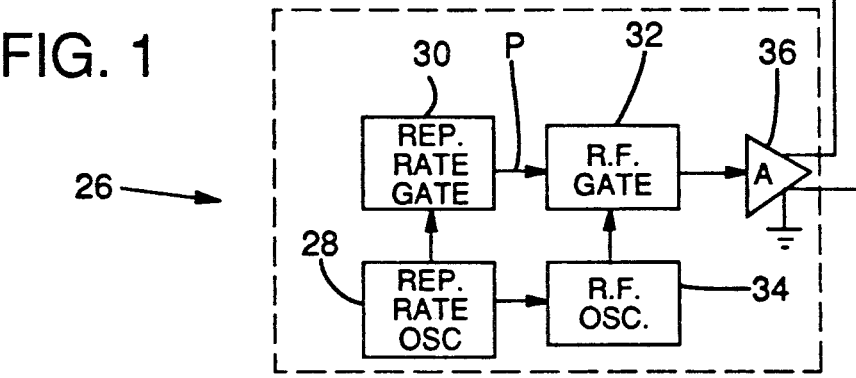
FIGS. 2A and 2B show the polarization characteristics of output light developed in response to vertically polarized input light for, respectively, a prior art acousto-optic Q-switch and an acousto-optic Q-switch of the present invention.
Figure 2A:
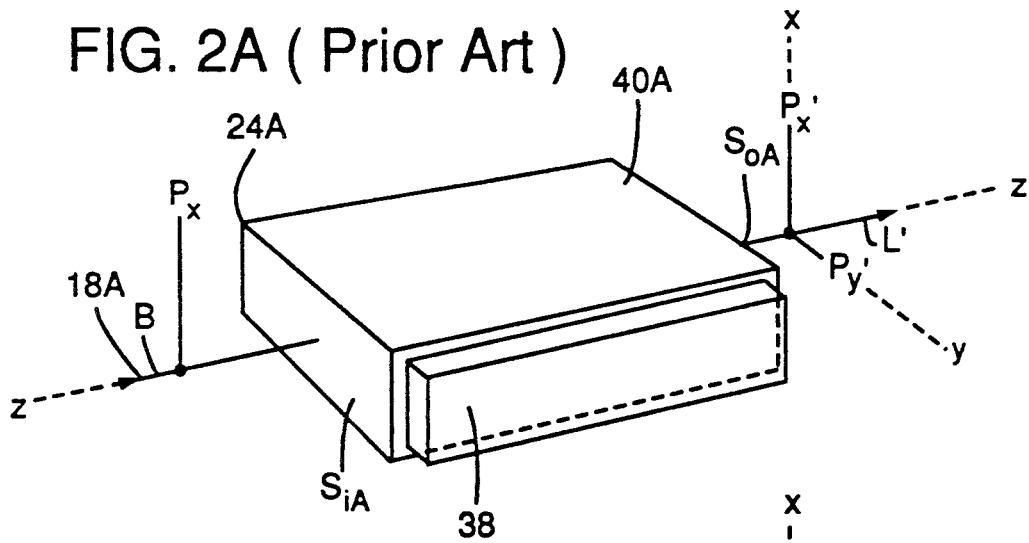
Figure 2B:
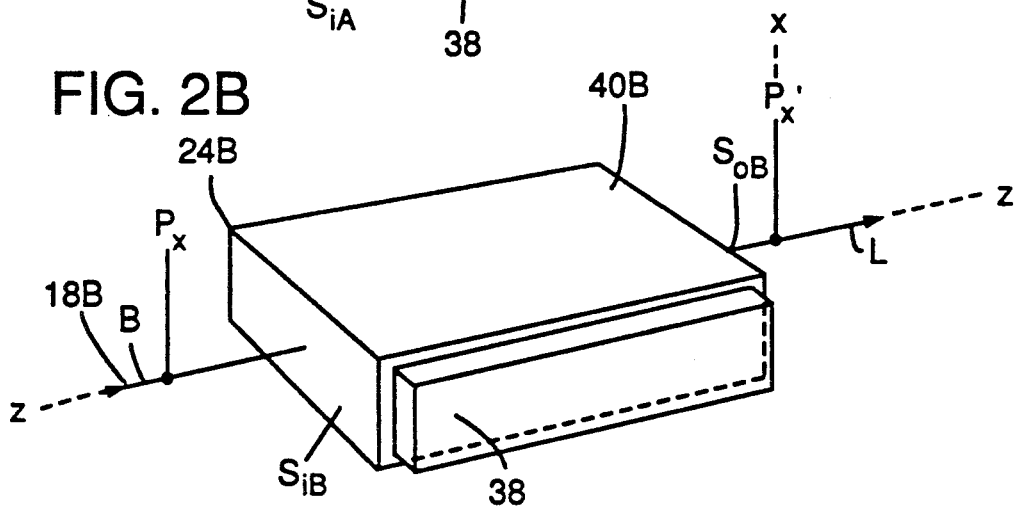

FIGS. 2A and 2B are schematic isometric views of, respectively, a prior art acousto-optic Q-switch 24A and an acousto-optic Q-switch 24B embodying the present invention. Q-switches 24A and 24B use similar transducers 38 but use different optical media 40A and 40B, respectively. Both of Q-switches 24A and 24B receive a vertically polarized incident light beam B having polarization component Px.

With reference to FIG. 2A, the vertically polarized light beam B having polarization component Px travels along optic axis 18A and strikes an input surface $S_{LA}$ of optical medium 40A. Optical medium 40A distorts the vertically polarized beam B and produces an elliptically polarized, i.e., distorted, output pulse L, that exits medium 40A from output surface $S_{oA}$. The output pulse L, has a vertical component Px, of lesser intensity than that of the Px component and a horizontal component Py' of lesser intensity than that of the Px' component.

With reference to FIG. 2B, vertically polarized light beam B having polarization component Px travels along optic axis 18B and strikes input surface $S_{iB}$ of optical medium 40B. Optical medium 40B maintains the vertical polarization of beam B and produces a vertically polarized output pulse L that exits medium 40B in the X-Z plane from output surface $S_{oB}$. The output pulse L has a vertical component Px, of substantially the same intensity as that of the Px component striking input surface $S_{iB}$.

The selection of optical medium 40B is partly based on certain mathematical relationships. The ratio of the change in indices of refraction to mechanical stress gives a stress-optical coefficient K, which can be expressed as:

$$K = (n_{parallel} - n_{perpendicular})/\sigma.$$

where $\sigma$ is mechanical stress and $n_{parallel}$ and $n_{perpendicular}$ are the respective indices of refraction for electromagnetic waves polarized parallel or perpendicular to the direction of the stress. The stress-optical coefficient K can be a good indicator of a stress-tolerant optical medium. Table I below lists certain commonly used materials for acousto-optic devices and their associated K coefficients at 589.3 nm and 21° C.

TABLE I

| Material | K × 10⁻⁶ mm²/N |
|---|---|
| Fused Silica (Dynasil) | 3.46 |
| BK-7 (Schott) | 2.74 |
| F-2 (Schott) | 2.81 |

TABLE I-continued

| Material | K × 10⁻⁶ mm²/N |
|---|---|
| SF-10 (Schott) | 1.95 |

Materials having low K values tend to have greater resistance to birefringence. Table I above indicates that SF-10 glass has a lower susceptibility than fused silica to a change in refractive index as a function of stress.

For acousto-optic devices, there is another relevant parameter, called the acousto-optic figure of merit M, which can be expressed in terms of diffraction efficiency and applied acoustic power as:

$$\eta = \frac{\pi^2 d}{2\lambda^2 H} M P_a.$$

where $$M = \frac{n^6 p^2}{\rho v^3}.$$

$\eta$ is the diffraction efficiency, p is the photoelastic coefficient, $\rho$ is the mass density, $v$ is the acoustic velocity, d is the interaction length of the acoustic wave column, H is the height of the acoustic beam, and $P_a$ is the applied acoustic power. The above expression can be simplified to show that the diffraction efficiency $\eta$ is directly proportional to the quantity $MP_a$.

The properties of the present invention may be characterized in terms of both optical stress and diffraction efficiency to define a new stress-efficiency parameter M', which can be expressed as:

$$M' = (n_{parallel} - n_{perpendicular})/\eta = \frac{K\sigma}{MP_a}.$$

Since $\rho$ is directly proportional to $P_a$, M' is directly proportional to K/M. A simpler parameter $\kappa$, which is called the optical stress-merit coefficient, can be defined as $\kappa \equiv K/M$, i.e., the coefficient $\kappa$ is the ratio of the mechanical stress-optical coefficient K to the acousto-optic figure of merit M. The coefficient $\kappa$ can be used to determine which materials would likely provide superior optical performance under conditions of thermal or mechanical stress.

The equations presented above can, therefore, be used to determine which materials are likely to provide the best Q-switches. Although acoustic velocity values are not tabulated for individual glass types, it is known that the velocity values for fused silica, BK-7 glass, and flint glass are 6 km/sec, 5 km/sec, and 3–4 km/sec, respectively. The photoelastic coefficients p for readily available glass types are about 0.3.

Using these values in conjunction with data from manufacturer's glass specification data sheets, such as the Schott Glass Catalog and Technical Bulletin No. 15, facilitates the calculation of the stress-merit coefficient $\kappa$ for the materials listed in Table I. Table II below shows a comparison of the optical stress-merit coefficients $\kappa$ calculated at 589.3 nm for the materials listed in Table I and for Schott SF-57 glass.

TABLE II

| Material | $\kappa$ = K/M |
|---|---|
| Fused Silica | 2059 |
| BK-7 | 794 |

TABLE II-continued

| Material | κ = K/M |
|---|---|
| F-2 | 399 |
| SF-10 | 223 |
| SF-57 | 30 |

The κ coefficients for the commonly used acousto-optic materials listed in Table II range from for fused silica, which is commonly used in Q-switches, to 223 for SF-10, which is used in a diode-pumped YAG Q-switched laser. Prior art acousto-optic devices fabricated from these materials demonstrate significant mechanically induced stress near the acoustic transducer bond area and thermally induced stress from an RF signal applied to the transducer. SF-57 glass, whose intended use is for purposes of radiation shielding but which is the material incorporated in the present invention, has an optical stress-merit coefficient κ of 30, which is 7.4 times better than that of SF-10 glass.

FIG. 3 shows a test apparatus 50 for evaluating the optical performance of an acousto-optic device 52 of different types. Test apparatus 50 comprises a light source 54 that delivers noncoherent light $B_r$ through a pinhole filter aperture 57 along an optic axis 56 to a collimating lens 58 and a neutral density linear polarizer 60. A collimated and polarized beam $B_p$ exits polarizer 60 and strikes the optical medium 62 of acousto-optic device 52 having an acoustic wave transducer 64. The beam $B_p$ travels through optical medium 62 and exits optical medium 62 as the beam $B_d$, which strikes an analyzer 66 whose transmission axis is disposed perpendicular to the polarization direction of incoming beam $B_d$. The components $P_y'$ of the beam $B_d$ pass through analyzer 66 and an imaging lens 67 and are finally projected onto a translucent screen 68, where a photograph of the resulting light pattern is taken by a camera 70.

The advantages of the present invention may be demonstrated in test apparatus 50 by separately employing as the acousto-optic device 52 a Q-switch fabricated from fused silica (designated by the reference number 52A, not shown in FIG. 3) and an acousto-optic modulator fabricated from SF-57 glass (designated by the reference number 52B, not shown in FIG. 3). The modulator differed from the Q-switch only in that the Q-switch had two transducers and the acousto-optic modulator had one transducer. Each of the transducers generated a 40 MHz acoustic wave with a 2 mm wide active area. Applicant believes that the following comparison of the optical performance characteristics of the above-described Q-switch and acousto-optic modulator verifies the improved optical performance of an acousto-optic device fabricated from SF-57 glass.

Figure 4B:
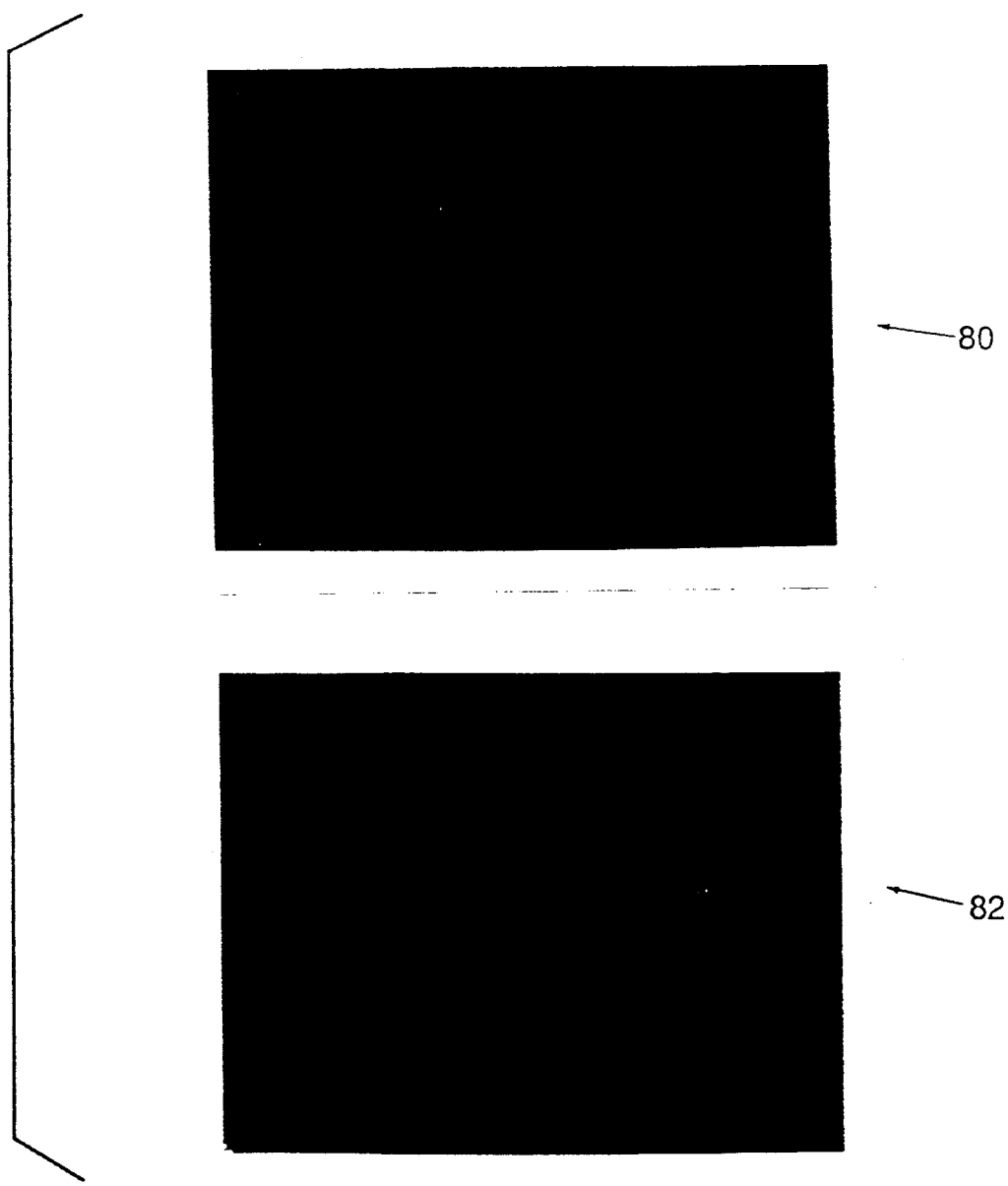

FIGS. 4A and 4B are two pairs of photographs of screen 68 showing the light patterns resulting from a linearly polarized incident beam $B_p$ passing through the respective acoustic-optic devices 52A and 52B in test apparatus 50 shown in FIG. 3. In particular, in FIG. 4A, photographs 76 and 78 of screen 68 show respective light patterns 84 and 86 generated by light propagating from a conventional fused silica Q-switch 52A placed in test apparatus 50, the light pattern 84 representing the light output without a RF signal applied to the transducer 64 and the light pattern 86 representing the light output with a 5 watt RF signal applied to transducer 64. In FIG. 4B, photographs 80 and 82 of screen 68 show the absence of the light patterns when an acoustic-optic modulator 52B comprised of SF-57 glass is placed in the test apparatus 50, the photograph 80 representing the light output without a RF signal applied to transducer 64 and the photograph 82 representing the light output with a 5 watt RF signal applied to transducer 64.

In the absence of distortion or birefringence, analyzer 66 prevents light patterns from appearing in the photographs. In FIG. 4A, light pattern 84 which includes light transmitting regions 92 and non-transmitting regions 94 results, therefore, from distortion of the polarized beam $B_p$ caused by defects in the conventional fused silica Q-switch. Light pattern 84 is predominately composed of light transmitting regions 92 and suggests that substantial off-axis light is developed throughout almost the entire volume of the fused silica Q-switch. The slightly reduced proportion of light transmitting regions 96 in light pattern 86 suggests that the acoustic wave applied by transducer 64 to the fused silica Q-switch is only partly effective in eliminating off-axis or distorted light.

Photographs 80 and 82 in FIG. 4B exhibit virtually no light. The absence of light in photograph 82 suggests that performance of the SF-57 glass modulator is not adversely affected by thermal or mechanical stress caused by an operating transducer. The SF-57 glass modulator provides, therefore, a relatively large usable region that comprises the greater volume of the optical medium through which a light beam may be passed without being subject to distortion or birefringence.

Applicant notes that extraneous light regions and interference patterns of an artifactual nature may result from the use of test apparatus 50 when a coherent light source is substituted for light source 54 and polarizer 60 is removed. The use of a high quality collimator and proper treatment of the light communicating surfaces of acousto-optic devices 52A and 52B with an anti-reflective coating would alleviate such artifacts. Applicant believes that under such conditions the photographs would appear substantially the same as those presented herein.

It will be obvious to those having ordinary skill in the art that various changes may be made in the details of the above-described preferred embodiment of the present invention without departing from the underlying principles thereof. For example, in addition to being incorporated into Q-switched lasers, acousto-optic devices with better beam quality and position accuracy may be used as Bragg cells, modulators, attenuators, and other devices useful in acousto-optic applications. The scope of the present invention should, therefore, be determined only by the following claims.

I claim:

1. A method for providing an acousto-optic device which modulates a property of polarized light propagating therethrough and from which exits substantially distortion-free modulated polarized light, the acousto-optic device having a light receiving surface and a light exiting surface, the method comprising:

providing an optical medium through which light propagates between the light receiving and light exiting surfaces; and physically coupling an acoustic wave transducer to the optical medium to enable generation of acoustic waves that propagate through and interact with the optical medium to modulate a property of the polarized light, the transducer-coupled optical medium having a substantially uniform index of refraction resistant to stress-induced nonuniform deviation in a substantially large and substantially stationary usable region, a portion thereof through which the polarized light propagates to provide directionally accurate delivery of substantially undistorted polarized light modulated by the acousto-optic device.

2. The method of claim 1 further including alternating propagation and cessation of acoustic waves within the acousto-optic medium to cause respective accumulation and release of polarized light energy from a laser cavity such that the acousto-optic device functions as a laser Q-switch.

3. The method of claim 1 in which the optical medium is characterized by a stress-optical coefficient of a value substantially less than $1.95 \times 10^{-6}$ K.

4. The method of claim 1 in which a stress-optical coefficient and an acousto-optic figure of merit characteristics the optical medium, and the ratio of the stress-optical coefficient to the acousto-optic figure of merit of the optical medium is substantially less than 220κ.

5. The method of claim 1 in which the optical medium comprises SF-57 glass.

6. The method of claim 1 further comprising acoustic wave generating means electrically connected to the acoustic wave transducer for driving the acoustic wave transducer to introduce an acoustic wave that propagates within the optical medium and modulates a property of the polarized light propagating through the optical medium.

7. The method of claim 1 in which an optic axis defines an optical path that intersects the light receiving and light exiting surfaces and in which the acoustic wave transducer comprises a longitudinal acoustic wave transducer that introduces acoustic waves that propagate through the medium in a direction transverse to the optic axis.

8. The method of claim 7 in which the light receiving surface and the light exiting surface form planes perpendicular to the optic axis.

9. The method of claim 1 in which the optical medium of the acousto-optic device enables delivery of a high precision light beam with good beam shape.

10. An acousto-optic device which modulates a property of polarized light propagating therethrough and which has a light receiving surface and a light exiting surface, and from which exits substantially distortion-free modulated polarized light, the acousto-optic device comprising:
   an optical medium having a substantially uniform index of refraction resistant to stress-induced nonuniform deviation in a substantially large and substantially stationary usable region between the light receiving surface and the light exiting surface; and
   an acousto wave transducer cooperating with and physically coupled to the optical medium to produce acoustic waves that propagate through and interact with the optical medium to modulate a property of the polarized light,
   the optical medium cooperating with the acoustic wave transducer to form an acousto-optic device that has a substantially uniform index of refraction resistant to stress-induced nonuniform deviation in the usable region between the light receiving surface and the light exiting surface and thereby enables directionally accurate delivery of substantially undistorted polarized light modulated by the acousto-optic device.

11. The acousto-optic device of claim 8 in which propagation and cessation of acoustic waves within the optical medium are alternated to cause respective accumulation and release of polarized light energy from a laser cavity such that the acousto-optic device functions as a laser Q-switch.

12. The acousto-optic device of claim 10 in which the optical medium is characterized by a stress-optical coefficient of a value substantially less than $1.95 \times 10^{-6}$ K.

13. The acousto-optic device of claim 10 in which a stress-optical coefficient and an acousto-optic figure of merit characterize the optical medium, and the ration of the stress-optical coefficient to the acousto-optic figure of merit of the optical medium is substantially less than 200κ.

14. The acousto-optic device of claim 10 in which the optical medium comprises SF-57 glass.

15. The acousto-optic device of claim 10 further comprising acoustic wave generating means electrically connected to the acoustic wave transducer for driving the acoustic wave transducer to introduce an acoustic wave that propagates within the optical medium and modulates a property of polarized light propagating through the optical medium.

16. The acousto-optic device of claim 10 in which an optic axis defines an optical path that intersects the light receiving and light exiting surface and in which the acoustic wave transducer comprises a longitudinal acoustic wave transducer that introduces acoustic waves that propagate through the medium in a direction transverse to the optic axis.

17. The acousto-optic device of claim 10 in which the optical medium of acousto-optic device enables delivery of a high precision light beam with a good beam shape.

18. The acousto-optic device of claim 9 in which the light receiving surface and the light exiting surface form planes perpendicular to the optic axis.

19. A laser system for processing a target material, the laser system including a light source and having a laser rod positioned between a pair of mirrors along an optic axis, the laser system comprising:
   an acousto-optic device which modulates a property of polarized light propagating therethrough, which has a light receiving surface and a light exiting surface, and from which exits substantially distortion-free modulated polarized light, the acousto-optic device including:
   an optical medium having a substantially uniform index of refraction resistant to stress-induced nonuniform deviation in a substantially large and substantially stationary usable region between the light receiving surface and the light exiting surface, and
   an acoustic wave transducer cooperating with and physically coupled to the optical medium to produce acoustic waves that propagate through and interact with the optical medium to modulate a property of the polarized light,
   whereby the optical medium cooperates with the acoustic wave transducer to form an acousto-optic device that has a substantially uniform index of refraction resistant to stress-induced nonuniform deviation in the usable region between the light receiving surface and the light exiting surface and thereby enables directionally accurate delivery of substantially undistorted polarized light modulated by the acousto-optic device.

20. The laser system of claim 19 in which the optical medium is SF-57 and the acousto-optic device is a Q-switch.

* * * * *

UNITED STATES PATENT AND TRADEMARK OFFICE
CERTIFICATE OF CORRECTION

PATENT NO. : 5,121,245
DATED : June 9, 1992
INVENTOR(S) : Joel C. Johnson

It is certified that error appears in the above-identified patent and that said Letters Patent is hereby corrected as shown below:

Column 1, line 45, after "Thus" insert --,--.
Column 5, line 29, change "$S_{LA}$" to --$S_{1A}$--.
Column 5, line 32, change "L," to --L'--.
Column 5, line 33, change "L," to --L'--.
Column 5, line 34, change "Px," to --Px'--.
Column 5, line 44, change "Px," to --Px'--.
Column 6, line 39, change "$_p$" to --$\sigma$--.
Column 7, line 9, after "from" insert --2059--.
Claim 4, lines 2 and 3, column 9, lines 16 and 17, change "characteristics" to --characterizes--.
Claim 18, line 1, column 10, line 33, change "9" to --10--.

Signed and Sealed this

Twenty-first Day of June, 1994

Attest:

BRUCE LEHMAN

*Attesting Officer*     *Commissioner of Patents and Trademarks*